(12) United States Patent
Hanamoto et al.

(10) Patent No.: US 7,072,263 B2
(45) Date of Patent: Jul. 4, 2006

(54) OPTICAL DISC RECORDING AND PLAYBACK APPARATUS

(75) Inventors: Yasushi Hanamoto, Hanyu (JP); Toshihiko Hiroshima, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 538 days.

(21) Appl. No.: 10/354,499

(22) Filed: Jan. 29, 2003

(65) Prior Publication Data
US 2003/0151990 A1 Aug. 14, 2003

(30) Foreign Application Priority Data
Feb. 13, 2002 (JP) .............................. 2002-035384

(51) Int. Cl.
*G11B 7/00* (2006.01)
(52) U.S. Cl. .............................. 369/53.31; 369/47.32; 369/44.25
(58) Field of Classification Search ............... 369/47.3, 369/47.44, 53.18, 47.34, 47.39, 44.25, 53.31, 369/47.32
See application file for complete search history.

(56) References Cited

U.S. PATENT DOCUMENTS

| | | | | |
|---|---|---|---|---|
| 5,737,481 | A | * | 4/1998 | Gushima et al. ............. 386/113 |
| 2001/0053112 | A1 | * | 12/2001 | Matsui ....................... 369/47.3 |
| 2002/0150011 | A1 | * | 10/2002 | Tsukihashi et al. ....... 369/47.33 |
| 2003/0058761 | A1 | * | 3/2003 | Hanamoto et al. ......... 369/47.3 |
| 2003/0095482 | A1 | * | 5/2003 | Hung et al. .............. 369/47.44 |
| 2003/0117912 | A1 | * | 6/2003 | Yoshimi et al. .......... 369/44.28 |

* cited by examiner

*Primary Examiner*—Thang V. Tran
*Assistant Examiner*—Crystal Jones
(74) *Attorney, Agent, or Firm*—Hogan & Hartson LLP

(57) ABSTRACT

A pickup control circuit (5) for performing a control operation of an optical pickup (3) and an error detection circuit (14) for detecting an error signal from a servo signal obtained from the pickup control circuit (5) are provided. During an operation to change to a faster recording speed, a playback operation for an already recorded signal is performed at the recording speed after the change, and an error detection level is set on the basis of characteristics of the servo signal in the playback operation state.

10 Claims, 1 Drawing Sheet

OPTICAL DISC RECORDING AND PLAYBACK APPARATUS

BACKGROUND OF THE INVENTION

1. Field of the Invention

The present invention relates to an optical disc recording and playback apparatus that is configured so as to record signals onto a disc by a laser emitted from an optical pickup and to perform playback of the signals that have been recorded on the disc by the laser.

2. Description of the Related Art

Disc players for performing operations to read signals that have been recorded on a disc using an optical pickup are popular. However, in addition to the playback function, optical disc recording and playback apparatuses, which are configured to enable the recording of signals to discs by a laser emitted from the optical pickup, have recently been manufactured on a commercial basis.

Furthermore, optical disc recording and playback apparatuses have recently been developed to enable the recording of signals in a state controlling the rotation of the disc at fast constant linear velocities, such as 4X, 8X, 12X, and 16X with respect to a standard recording linear velocity.

More recently, amidst the demand for faster recording speeds, a technique called zone CLV has been developed. Since the rotational speed of a spindle motor becomes extremely fast when the recording linear velocity is increased at the inside of the disc, this technique performs the recording operation at a low constant linear velocity at the inside of the disc, and changes the linear velocity to a faster velocity when the recording position moves toward the outside of the disc.

The optical disc recording and playback apparatus is configured to perform the recording operation of signals according to a record command from a host. This recording operation first stores the signal, which is to be recorded onto the disc, into a buffer RAM, then records the signal onto the disc by reading out the signal that is stored in the buffer RAM. A recent development is an optical disc recording and playback apparatus that is capable of resuming the recording operation from a position at which the recording was interrupted, such as due to the apparatus receiving an impact during the recording operation.

When the optical disc recording and playback operation receives an impact during a recording operation, the tracking servo signal and the focus servo signal for performing control operations of the optical pickup are greatly disrupted. For this reason, the apparatus is configured to perform a control operation when the recording is interrupted by detecting whether or not the level of the changing servo signal at this time exceeds an error detection level.

SUMMARY OF THE INVENTION

When the recording speed to the disc is changed in the present invention, the reading of signals from the buffer memory is first interrupted, and the recording of signals to the disc is interrupted. In this state, the rotational speed of the disc is changed to match the recording speed after the change and the signal that was recorded prior to the interruption is played back at the rotational speed after the change. Then, the servo signal during this playback is detected, and the error detection level during recording at the recording speed after the change is set on the basis of the state of the detected servo signal.

DETAILED DESCRIPTION OF THE PREFERRED EMBODIMENTS

Figure 1:
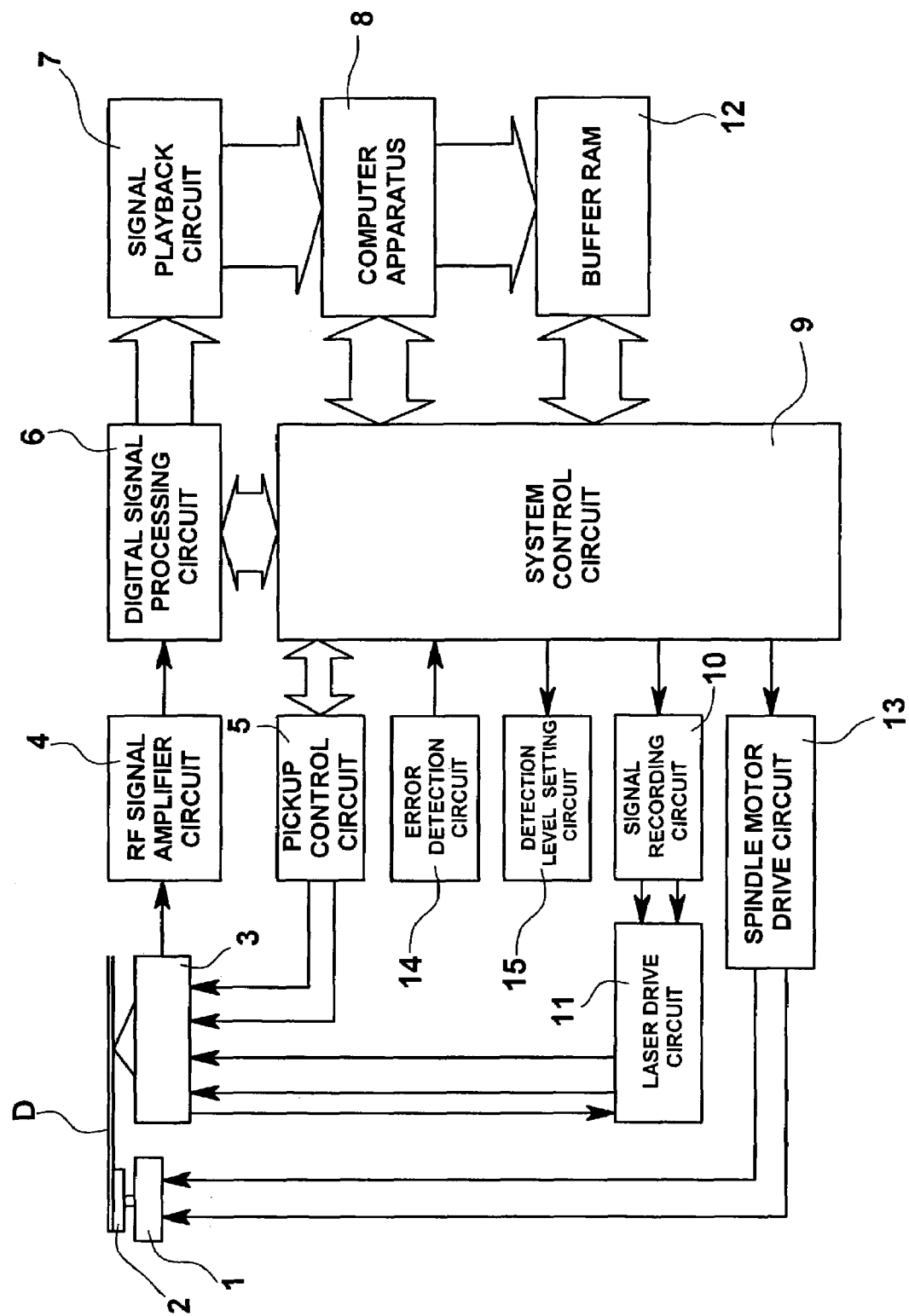
FIG. 1 is a block diagram showing an embodiment of an optical disc recording and playback apparatus relating to the present invention.

FIG. 1 is a block diagram showing an embodiment of an optical disc recording and playback apparatus relating to the present invention. In the FIGURE, a disc D, which is mounted onto a turntable 2 rotationally driven by a spindle motor 1, is rotationally driven by the rotation of the turntable 2. Furthermore, the disc D has been recorded with positional information data along a wobble groove, and the signal recording and playback operations are performed on the basis of the wobble signal obtained from this groove.

An optical pickup 3, which has a built-in laser diode for emitting a light beam to the disc D, a monitor diode for monitoring the light emitted from the laser diode, and a light detector for receiving the light beam reflected from the signal surface of the disc D, is moved along a radial direction on the disc D by a pickup feed motor (not shown).

An RF signal amplifier circuit 4 performs amplification and wave-shaping of an RF signal obtained from the light detector built into the optical pickup 3. A pickup control circuit 5, which has a built-in focus servo circuit and a tracking servo circuit, performs a focusing control operation for focusing the light beam of the optical pickup 3 onto the signal surface of the disc D on the basis of the signal obtained via the RF signal amplifier circuit 4, and a tracking control operation for tracking the light beam to a signal track on the signal surface.

A digital signal processing circuit 6 performs digital signal processing on signals output from the RF signal amplifier circuit 4 and performs demodulation on various types of signals. A signal playback circuit 7 inputs a digital signal that has been processed by the digital signal processing circuit 6, and implements an action to convert the information to an analog signal, then outputs it, such as to an amplifier, when the information recorded on the disc D is an audio signal, or an action to output the information without change as a digital signal to a computer apparatus 8 provided externally as a host when the information is a digital signal, such as computer software.

A system control circuit 9 inputs the signal demodulated by the digital signal processing circuit 6 and performs various control operations in accordance with command signals that are output from the external computer apparatus 8. A signal recording circuit 10 inputs a recording signal, such as a test signal or an information signal, and to correspond to this signal, controls the laser emission operation by a laser drive circuit 11 so as to record (a data signal) onto the disc D.

A buffer RAM 12 is first stored with the signal to be recorded onto the disc D and is configured so that it is written with the signal output from the computer apparatus 8, and the control operation of the system control circuit 9 controls the write operation and the read operation of the signal. A spindle motor drive circuit 13 has its operation controlled by the system control circuit 9 and has an action for controlling the rotational drive of the spindle motor 1, which drives the rotation of the disc D. Then, this rotational drive control operation is designed to maintain a standard linear velocity as well as to enable rotation at a constant linear velocity of 12X at the inside of the disc D, and to 16X or 24X or more as the recording position moves toward the outside.

An error detection circuit 14 detects an error signal from the servo signal obtained from the tracking servo circuit or the focus servo circuit built into the pickup control circuit 5. When the error signal exceeds an error detection level set by a detection level setting circuit 15, the detected output is output to the system control circuit 9.

In this configuration, during the recording operation of signals to the disc D, the signal that is output from the computer apparatus 7 is stored by a write operation into the buffer RAM 12, and by controlling the read operation of the stored signal the recording operation of the signal to the disc D is controlled. Then, after the recording operation of the signal to the disc D is interrupted and the recording operation is resumed, an operation is performed to compare the signal stored in the buffer RAM 12 and the signal recorded on the disc D before the interruption so that the signal is recorded in succession to the signal that was recorded before the interruption, namely, the signal is recorded in what is called a seamless manner.

Furthermore, in a state in which the recording operation of the signal is being performed, if the servo is detected to be abnormal by the signal that is detected by the error detection circuit 14, the recording operation of the signal to the disc D is first interrupted. When the servo is detected to have returned to a normal state, the recording operation of the signal to the disc D is then resumed.

In the recording operation state, when the recording position moves toward the outside of the disc and the recording position reaches a preset position, an operation changes the recording linear velocity to a faster velocity. This operation is performed by the recording interruption and resume operation. Namely, after the recording operation to the disc D is first interrupted, the rotational speed of the disc D is switched to a state of fast constant linear velocity, and the recording operation is resumed when the linear velocity stabilizes at the fast linear velocity.

The optical disc recording and playback apparatus has the configuration as described above. The playback operation in the circuit configured in this manner will be described next. When a command signal is output from the computer apparatus 8 to the system control circuit 9 comprising the drive apparatus for performing the playback operation, a control operation for the playback operation by the system control circuit 9 begins. When this playback operation is performed, a driving current is supplied from the laser drive circuit 11 to the laser diode that is built into the optical pickup 3 to obtain a laser output for performing the signal read operation.

When a control operation for this playback operation begins, a rotation control operation of the spindle motor 1 is performed by the spindle motor drive circuit 13. The rotation control operation of the spindle motor 1 rotationally drives the disc D at a constant linear velocity by comparing the synchronization signal obtained from decoding the wobble signal and a reference signal that is output from a reference signal generation circuit (not shown). This control operation is also performed in a similar manner during the signal recording operation to be described hereinafter.

The rotation control operation of the spindle motor 1 is performed as described above. At the optical pickup 3 for performing the signal read operation, the focusing control operation and the tracking control operation by the pickup control circuit 5 begin and the signal read operation from the disc D by the optical pickup 3 begins. Prior to the read operation, an operation is performed to read the TOC data recorded in the lead-in area comprising the first session on the disc D.

The playback operation for reading the signal that is recorded in the signal recording area of the first session provided on the disc D is performed according to the TOC data recorded in the lead-in area. The signal that was read by the optical pickup 3 passes through the RF signal amplifier circuit 4 where it is amplified and wave shaped, then is input by the digital signal processing circuit 6 where a demodulation operation of the signal is performed. When signal processing is performed by the digital signal processing circuit 6 and information is sampled, the information undergoes signal processing, such as error correction, and is then supplied to the signal playback circuit 7.

The signal playback circuit 7 converts the information that was read from the disc D into an analog signal, then outputs it, such as to an amplifier, when the information is an audio signal, and outputs the information without change as a digital signal to the computer apparatus 8 when the information is a data signal, such as computer software.

The playback operation is performed in the present embodiment as described above. The recording operation of signals to the disc D will be described next.

The operation for recording signals to the disc D first records a test signal in a test write area provided on the inside of the disc D and plays back the recorded test signal so as to supply a driving current to the laser diode to obtain an optimum laser output for the recording operation. When this setting operation for the laser output is performed, an operation is performed to read the information that is recorded in an area on the disc D called the buffer, namely, the positional information of the signal recorded in the signal recording area.

The recording operation of the data signal in the signal recording area provided on the disc D is possible on the basis of information read in this manner, or an operation is performed, such as to recognize the position at which the recording operation is to be performed.

When this recognition operation ends, the optical pickup 3 is moved to the starting position on the disc D of the recording operation, and a control operation is performed for rotationally driving the disc D at a linear velocity corresponding to that recording position. Furthermore, a write operation of the recording signal to the buffer RAM 12 begins simultaneously. When the write operation for the signal to be stored in the buffer RAM 12 is performed, the stored size of the signals stored in the buffer RAM 12 gradually increases. When the stored size exceeds a predetermined amount, the signals stored in the buffer RAM 12 are read out and input by the signal recording circuit 10. As a result, the control operation of the laser drive circuit 11 is performed by the signal recording circuit 10 so as to record the signals to the disc D.

This operation performs the recording operation of signals to the disc D. The write operation of signals to the buffer RAM 12 is performed according to the read operation of signals from the buffer RAM 12. When the read operation of signals is performed, the write operation of signals to the buffer RAM 12 repeatedly performs an operation to again write a signal to the position storing the signal that was read.

Then, when the recording operation of signals to the disc D is interrupted, the read operation of signals from the buffer RAM 12 is interrupted, and in this case, the write operation of signals to the buffer RAM 12 is also interrupted. When the recording operation of signals to the disc D is initiated from this state, the optical pickup 3 is moved to a position where the recording operation is to start, namely, the playback operation is performed after returning beyond the position where the recording operation was interrupted.

The signal that is played back by this playback operation is the signal that was recorded immediately prior to the interruption of the recording operation. An operation is performed to compare this signal and the signal that is stored in the buffer RAM 12. If this comparison determines that both signals are the same signal, an operation is performed to read a signal stored in succession to the signal stored in the buffer RAM 12 and compared in the comparison above, the signal is input by the signal recording circuit 10, and the recording operation of the signal to the disc D begins. The operation above makes it possible to interrupt and resume the recording of signals to the disc D, and by performing this operation, it is possible to continuously record signals and perform what is called a seamless recording operation even if the recording operation was interrupted.

The recording operation of signals is performed in the present embodiment as described above. The control operation will be described next when the servo is abnormal. The recording operation to the disc D of signals output from the computer apparatus 8 is performed as described above. However, while this recording operation is being performed, the error detection circuit 14 is in a state for constantly detecting the servo state of the focus servo circuit or the tracking servo circuit built into the pickup control circuit 5.

The detection level of the servo signal that is detected by the error detection circuit 14 is a level set by the detection level setting circuit 15. In this recording operation state, when the level of the servo signal does not exceed the error detection level, the detection signal is not output to the system control circuit 9 and the signal recording operation described above is performed.

In the state where the signal recording operation is being performed, when the optical disc recording and playback apparatus receives an impact, the level of the servo signal of the tracking servo circuit or focus servo circuit increases. When the level of this servo signal exceeds the error detection level, a detection signal is output from the error detection circuit 14 to the system control circuit 9. As a result, it is determined that the recording operation cannot be continued, and the control operation of the system control circuit 9 performs an operation to first interrupt the recording operation of signals to the disc D. When this interruption operation is performed, not only is it not interrupted to perform the recording operation of signals to the disc D, but it is also not interrupted to perform the write operation and the read operation of signals to and from the buffer RAM 12.

When in the state where this operation to interrupt the recording operation is performed, the tracking servo circuit and the focus servo circuit built into the pickup control circuit 5 are in a state to perform servo operations. In this state, when the state is restored in which servo operations by the tracking servo circuit and the focus servo circuit built into the pickup control circuit 5 can be performed, it is determined, from the detection signal that is output from the error detection circuit 14, that the recording operation can be performed. When this is determined, the recording operation of signals to the disc D resumes according to the control operation of the system control circuit 9. This operation to resume recording is performed by comparing a signal that is played back by a playback operation of the signal recorded on the disc D prior to the interruption described above and a signal that is stored in the buffer RAM 12. As a result of this operation, the signal recorded on the disc D becomes continuous to enable what is called a seamless recording operation to be performed.

The recording interruption and resume operation is performed as described above when the apparatus receives an impact. An operation to change the recording speed will be described next. In a state where the recording operation of signals is performed, when the recording position reaches a position where the linear velocity is to be changed, the control operation of the system control circuit 9 performs an operation to first interrupt the recording operation of signals to the disc D. When this interruption operation is performed, not only is it interrupted to perform the recording operation of signals to the disc D, but it is also interrupted to perform the write operation and the read operation of signals to and from the buffer RAM 12.

After this control operation is performed, a control operation begins for rotation at a fast linear velocity with respect to the spindle motor drive circuit 13, and a drive operation for rotating the disc D at a fast linear velocity is performed. Then, when the rotational speed of the disc D is at a state of fast constant linear velocity, the control operation of the system control circuit 9 begins the recording operation of signals to the disc D. This operation to resume recording is performed by comparing a signal that is played back by a playback operation of the signal recorded on the disc D prior to the interruption described above and a signal that is stored in the buffer RAM 12. As a result of this operation, the signal recorded on the disc D becomes continuous to enable what is called a seamless recording operation to be performed.

The recording interruption and resume operation is performed as described above while the recording operation is performed. The essence of the present invention will be described next.

In the recording operation state, when the recording position moves from the inside of the disc D to the outside, an operation is performed to change the recording linear velocity. As described above, this operation to change the recording linear velocity is performed by the recording interruption and resume operation. When resuming recording, the playback operation of a signal that was recorded prior to the interruption of recording is performed, and an operation to compare the played back signal and the signal stored in the buffer RAM 12 is performed to resume the recording operation. The playback operation that is performed prior to resuming the recording operation is performed at the changed faster linear velocity.

Then, when this playback operation is being performed, the servo operation of the optical pickup 3 is performed by the pickup control circuit 5. The system control circuit 9 recognizes the level change in the servo signal in this state, and an operation is performed to select the detection level of the error signal at the recording linear velocity from the level of the servo signal. The level selected in this manner is set for the detection level setting circuit 15, and this set level becomes the error detection level for detection by the error detection circuit 14. Since the error detection level is set in this manner, it is possible to perform a setting operation of an optimum error detection level for the linear velocity at which the recording operation is to be performed.

The servo signal mentioned here is, for example, the tracking servo signal or the focus servo signal. The tracking servo signal indicates the amount of tracking deviation with respect to the target tracking state obtained from the state of the reflected light. Furthermore, the focus servo signal indicates the amount of focusing deviation in the target focus state obtained from the state of the reflected light.

Therefore, the servo signal is larger when the deviation amount is large. From the magnitude of the servo signal, an abnormal condition, such as due to an impact, can be detected. In this case, the abnormal condition is determined by the increase in the servo signal over a predetermined value.

However, the magnitude of the servo signal also changes according to the linear velocity with respect to the optical pickup 3 of the disc D. In the present embodiment, the linear velocity is gradually changed depending on the radial position on the disc D. For example, it is set to 12X the standard velocity at the inside, 16X at the middle, and 24X at the outside.

Then, the recording is interrupted when the linear velocity is switched, the velocity is switched, and at a velocity after a subsequent switching the written signal is read. This signal is for detecting the write start position, and at this time the magnitude of the servo signal is detected. Then, from the magnitude of the servo signal in the playback operation for detecting the write position, a maximum value, for example, is detected. Then, a predetermined margin is added to the detected maximum value, and this is set as the error detection level.

As a result, an appropriate error detection level can be set after switching the linear velocity. In particular, the playback operation is necessary for resuming recording, and this operation does not require extra time.

Only one of either the tracking servo signal or the focus servo signal need be used for error detection, and in this case, only one error detection level need be set. On the other hand, if both the tracking servo signal and the focus servo signal are used for error detection, both error detection levels are set.

The error detection operation of the servo signal can be performed according to the signal that is obtained from the tracking servo circuit or according to the signal that is obtained from the focus servo circuit. Furthermore, although the change in the level of the servo signal in the present embodiment was described in response to an impact, the same operation can be performed when the level of the servo signal changes due to an abnormal disc condition. An abnormal disc rotation may also occur due to an abnormal disc condition.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An optical disc recording and playback apparatus for reading a signal first stored in a buffer memory and recording the read signal to a disc, and changing the signal recording speed with respect to the disc according to a radial position on the disc, the optical disc recording and playback apparatus comprising:
    an optical pickup for emitting light onto the disc and detecting reflected light;
    a pickup control circuit for generating a servo signal on the basis of the state of the reflected light that is detected by the optical pickup, and on the basis of this servo signal, for controlling the emitted light by the optical pickup;
    an error detection circuit for comparing the servo signal that is obtained in the pickup control circuit and a predetermined error detection level, and detecting errors on the basis of the obtained comparison result; and
    a system control circuit for first interrupting reading of a signal from the buffer memory and interrupting recording of the signal to the disc when changing said recording speed, in this state changing the rotational speed of the disc so as to correspond to the recording velocity after the change, playing back the signal recorded prior to the interruption at the rotational speed after the change, detecting the state of said servo signal during this playback, and setting said error detection level in the recording at the recording speed after the change on the basis of the state of the detected servo signal.

2. An apparatus according to claim 1, wherein:
said servo signal is about a deviation with a target;
said error detection circuit outputs said error signal when said servo signal is larger than the error detection level; and
said disc recording and playback apparatus interrupts the recording operation on the basis of the error signal.

3. An apparatus according to claim 2, wherein:
after the interruption of the recording a signal to the disk, the recording when the level of the servo signal is smaller than the error detection level are resumed.

4. An apparatus according to claim 1, wherein:
said servo signal is a tracking servo signal for controlling the state of tracking with respect to said disc of light emitted to the disc by said optical pickup.

5. An apparatus according to claim 1, wherein:
said servo signal is a focusing servo signal for controlling the state of focus with respect to the disc of light emitted to the disc by said optical pickup.

6. An apparatus according to claim 1, wherein:
said system control circuit detects the level of the servo signal in the playback state, and sets the error detection level by adding a predetermined margin to a maximum level that is detected.

7. An apparatus according to claim 1, wherein:
said system control circuit compares a playback signal about the already recorded signal and a signal being recorded to said buffer memory prior to interruption to recognize the position on the disc where recording was interrupted, and records from the interruption position the not-yet-recorded signal within the buffer memory in succession to the already recorded signal.

8. An apparatus according to claim 7, wherein:
said servo signal is about a deviation with a target;
said error detection circuit outputs said error signal when said servo signal is larger than the error detection level; and
said disc recording and playback apparatus interrupts the recording operation on the basis of the error signal.

9. An apparatus according to claim 7, wherein:
said system control circuit resumes signal recording by the same process while recording is interrupted during a recording speed change and while recording is interrupted according to an error signal.

10. An apparatus according to claim 1, wherein:
said recording speed is the linear velocity.

* * * * *